(12) United States Patent
Shoor

(10) Patent No.: US 7,760,830 B2
(45) Date of Patent: Jul. 20, 2010

(54) TECHNIQUES TO REDUCE THE IMPACT OF JITTER ON COMMUNICATIONS SYSTEM PERFORMANCE

(75) Inventor: Ehud Shoor, Haifa (IL)

(73) Assignee: Intel Corporation, Santa Clara, CA (US)

( * ) Notice: Subject to any disclaimer, the term of this patent is extended or adjusted under 35 U.S.C. 154(b) by 944 days.

(21) Appl. No.: 11/551,069

(22) Filed: Oct. 19, 2006

(65) Prior Publication Data
US 2008/0095283 A1    Apr. 24, 2008

(51) Int. Cl.
*H04B 1/10* (2006.01)
(52) U.S. Cl. .................. 375/350; 375/371; 375/346; 375/285; 455/63.1; 455/570; 455/296; 455/307
(58) Field of Classification Search .............. 375/350, 375/371, 346, 373, 285; 455/63.1, 570, 296, 455/307
See application file for complete search history.

(56) References Cited

U.S. PATENT DOCUMENTS 5,563,921 A    10/1996  Mesuda et al.
5,719,907 A *  2/1998  Kaku et al. .................. 375/371
6,985,550 B2   1/2006   Blake

FOREIGN PATENT DOCUMENTS

WO    2008/060809 A1    5/2008

OTHER PUBLICATIONS

"International Search Report and Written Opinion", PCT/US2007/081842, (Apr. 28, 2008), 10 pages.
International Preliminary Report on Patentability for PCT Patent Application No. PCT/US2007/081842 mailed on Apr. 30, 2009, 6 pages.

* cited by examiner

*Primary Examiner*—Phuong Phu
(74) *Attorney, Agent, or Firm*—Glen B Choi

(57) ABSTRACT

Techniques are described that can be used to reduce noise attributable to jitter in a received signal. Multiple filters may be available. The number of available filters may correlate to a period of channel-related jitter in terms of clock cycles. One of the filters may be activated for a particular clock cycle. The activated filter may provide a noise reducing signal based on a reference signal and error identified in a received signal. A filter may be used to provide a signal to reduce noise attributable to error signals from interleaved jittered channels.

25 Claims, 11 Drawing Sheets

TECHNIQUES TO REDUCE THE IMPACT OF JITTER ON COMMUNICATIONS SYSTEM PERFORMANCE

FIELD

The subject matter disclosed herein relates to techniques to reduce noise arising from jitter.

RELATED ART

A communications system that operates in full duplex over some medium typically has two major challenges that are addressed in the receiver: equalization of the incoming signal channel to compensate for inter-symbol interference and echo cancellation to provide suppression of the transmitted signal reflections into the local receiver. In some of the cases, the receiver also cancels noise from the neighbor transmitters (known as Near-End-Cross-Talk ("NEXT")), or from the link-partner's neighbor transmitters (known as Far-End-Cross-Talk ("FEXT")).

Traditional equalizers and echo and NEXT cancellers are adapted in such a way that they refer to an estimation which corresponds to the relevant sampled channel, namely, insertion-loss channel for equalizers and echo/NEXT channels for echo/NEXT cancellers. The term "channel" may refer to the transfer-function of an analog media that distorts an input signal. A feed-forward formation may be used in which a feed-forward-equalizer uses a channel inverse estimation. Interference cancellation may consider estimated interference effects from the channel and subtracts interference effects from the received signal. To implement interference cancellation, an echo/NEXT/FEXT canceller, or decision feed back equalizer (DFE) feedback filter, and so forth may be used.

An important factor that impacts performance of these devices is the amount of timing jitter introduced in the transmitted data as well as in the receiver side analog-to-digital conversion clock that samples the data. Jitter causes the effective channel to rapidly change in time, in a manner that is not be compensated by typical adaptive filters. Typical adaptive filters may have a very low tracking bandwidth due to aggressive averaging. As a result, the corresponding estimated channel may not follow the actual physical interference, thereby causing performance degradation.

BRIEF DESCRIPTION OF THE DRAWINGS

Embodiments of the present invention are illustrated by way of example, and not by way of limitation, in the drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Some embodiments provide equalization and/or cancellation techniques that may be non-linear and reduce noise arising from a time varying channel due to periodic jitter components. In some embodiments, instead of solely improving clock quality, some embodiments may address the jitter problem by addressing the mechanisms that suffer from the jitter. However, in some embodiments, clock quality may in addition be improved.

Figure 1:
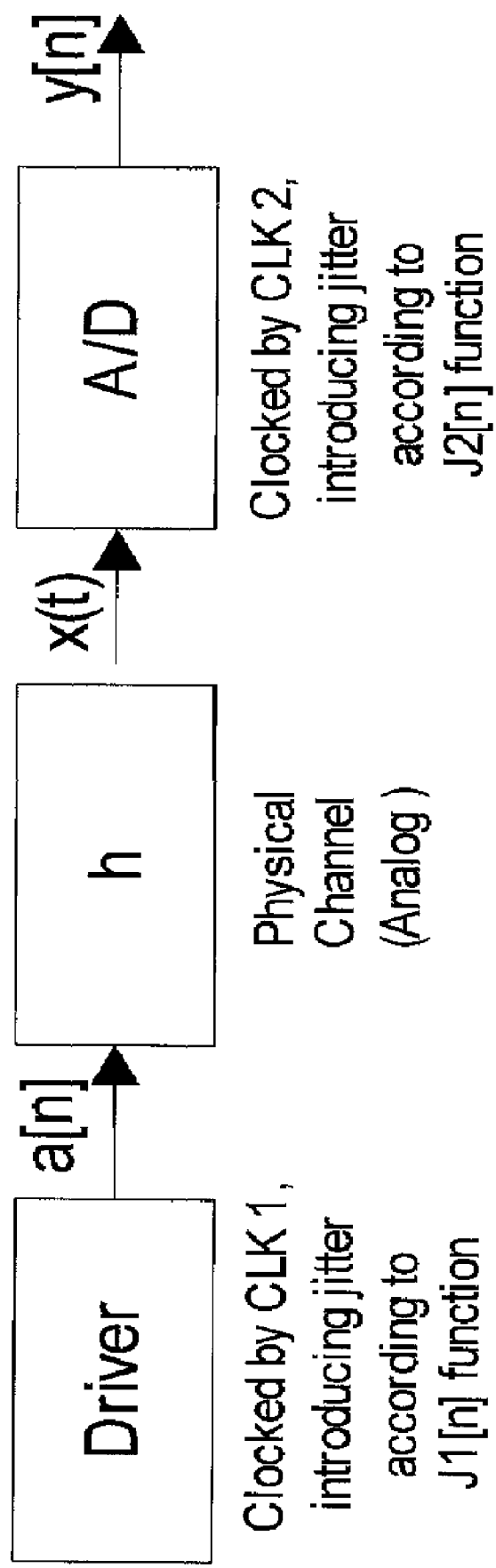
FIG. 1 provides a general scheme for modeling a data transmission path between two devices.

In many communication devices, a very large portion of the jitter content is periodic with typical frequencies that are related to the specific design characteristics (e.g., frequencies of dominant clocks in the device that add noise, as well as the power supply, reference clock frequency, and other sources). FIG. 1 provides a general scheme for modeling a data transmission path between two devices. The sampled output can be represented in equation 1:

$$y[n] = \sum_k a[k] \cdot h(n \cdot T - k \cdot T + J_2[n] - J_1[k]) \quad \text{(equation 1)}$$

When observing the sampled channel taps, which are expected to be estimated by the digital cancellers, the following may be found:

$$h[k=n-i]=h(i \cdot T+J_2[n]-J_1[n-i]), \quad \text{(equation 2)}$$

Equation 2 may show that the jitter functions J1 and J2 impact the channel taps in a time-dependent manner and can be derived directly from the relative jitter of the transmitter and the receiver.

Figure 2:
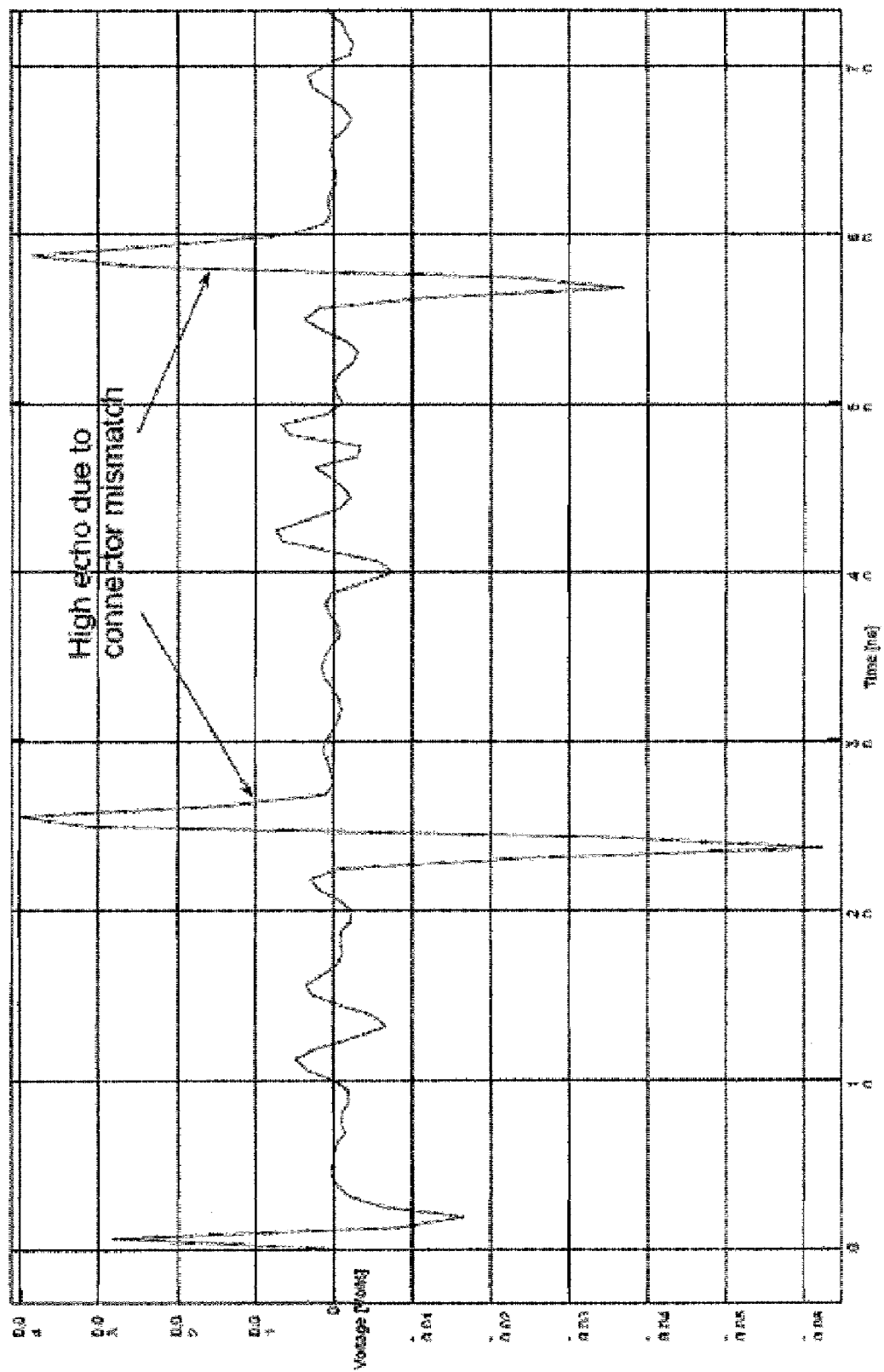
FIG. 2 depicts an example of an interference channel in the time domain.

Accordingly, jitter frequencies above an adaptive filter's tracking bandwidth may not be tracked, and error may be introduced. In systems that receive signals at high frequencies, e.g., 10 gigabit-per-second, the problem may be highly significant. Due to the high-frequencies involved, the interference channels may contain very sharp slopes so that even small timing variations can cause large errors in the channel estimation. FIG. 2 depicts an example of an interference channel in a system that receives signals at high frequencies (e.g., 10 gigabit-per-second).

For 10GBASE-T compliant receivers, one element which may suffer from excessive jitter is the ability to suppress echo and near-end crosstalk. 10GBASE-T is described in "IEEE Standard For Information Technology—Telecommunications and information exchange between systems—Local and metropolitan networks—Specific requirements Part 3: Carrier Sense Multiple Access with Collision Detection (CSMA/CD) Access Method and Physical Layer Specifications: Amendment: Physical Layer and Management Parameters for 10 Gb/s Type 10GBASE-T," Draft Amendment P802.3an/Draft 4.0, 2006 and revisions thereof (hereafter, "10GBASE-T").

For example, in environments with echo, some of the transmitted data is reflected back to the local receiver and added to the signal from the link-partner. The echo path starts from the local transmitter, going through the board connections (e.g. transformer and connectors with impedance mismatch that distort the signal) and sampled by the local analog-to-digital converter together with the far-end signal (i.e., signal received from the link partner transmitter). In this case, the echo driver is known because the transmitted data is known, but the transfer function (so called "channel") from the local transmitter to the analog-to-digital converter is unknown. If the channel can be estimated, then by knowing the input and the corresponding transfer function, the output can be determined and may be subtracted from a received signal to reduce noise due to jitter.

Although the physical transfer function is in continuous-time because it impacts an analog signal, the data is sampled in the receiver so the sampled version of the channel is sufficient for cancellation and the values in the sampling point are relevant:

$$\text{ADC\_In}(t) = \text{far\_end\_signal}(t) + \sum_k \text{echo\_data}[k] \cdot \text{echo\_channel}(t - kT)$$

$$\text{ADC\_Out}[t = nT] =$$
$$\text{far\_end\_signal}(t = nT) + \sum_k \text{echo\_data}[k] \cdot \text{echo\_channel}[nT - kT]$$

Relevant values of the echo channel that can be used to subtract the echo term are in the points t=i*T, where i is an integer and T is a basic clock period (e.g., the sampling rate).

Figure 3:
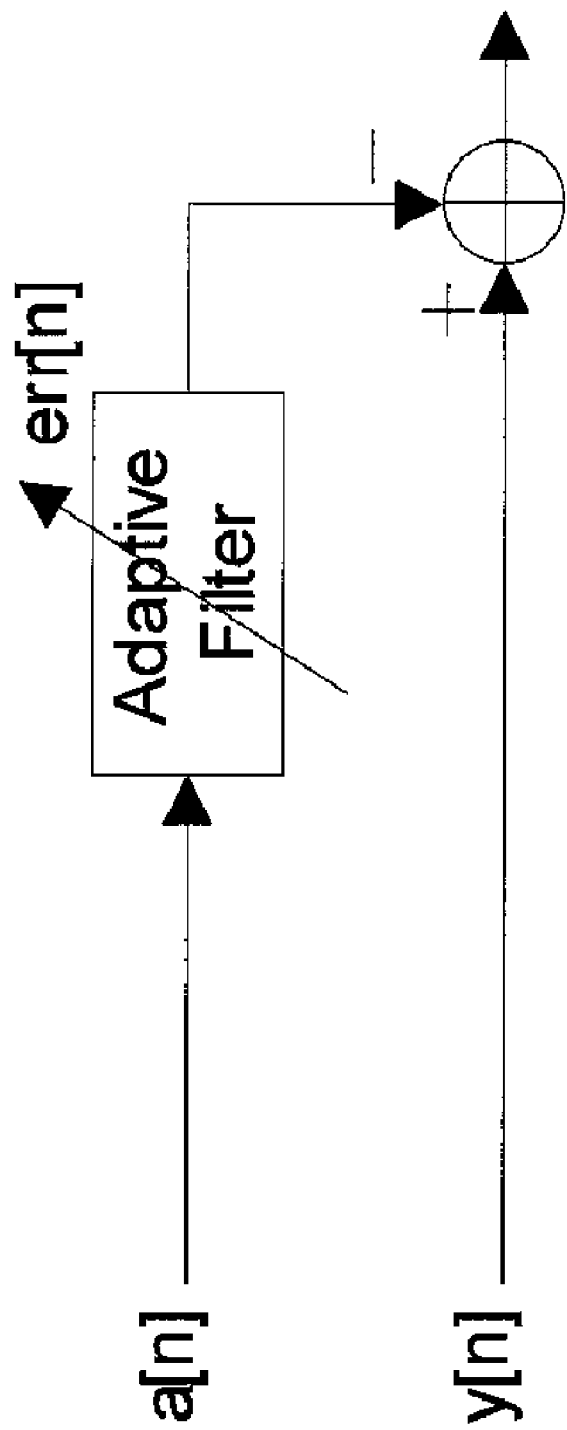
FIG. 3 depicts a traditional echo canceller architecture.

FIG. 3 presents a prior art echo canceller. Signal a[n] may represent local transmitter data to be transmitted to a remote receiver. Signal y[n] may represent signal received by the receiver. If the adaptive filter converges exactly to the discrete echo channel, then the echo may be subtracted from the received signal. Based on equation 2 above, in the case of additive jitter, the echo channel is not linear time invariant (LTI) because it depends on the jitter function. The important discrete values to be estimated may not be t=i*T as before, but points in time which depend on the jitter functions that vary in time. Conventional adaptive filters (such as that depicted in FIG. 3) may be able to converge to the optimum solution only under the assumption that the channel is LTI or changing slowly.

Figure 4:
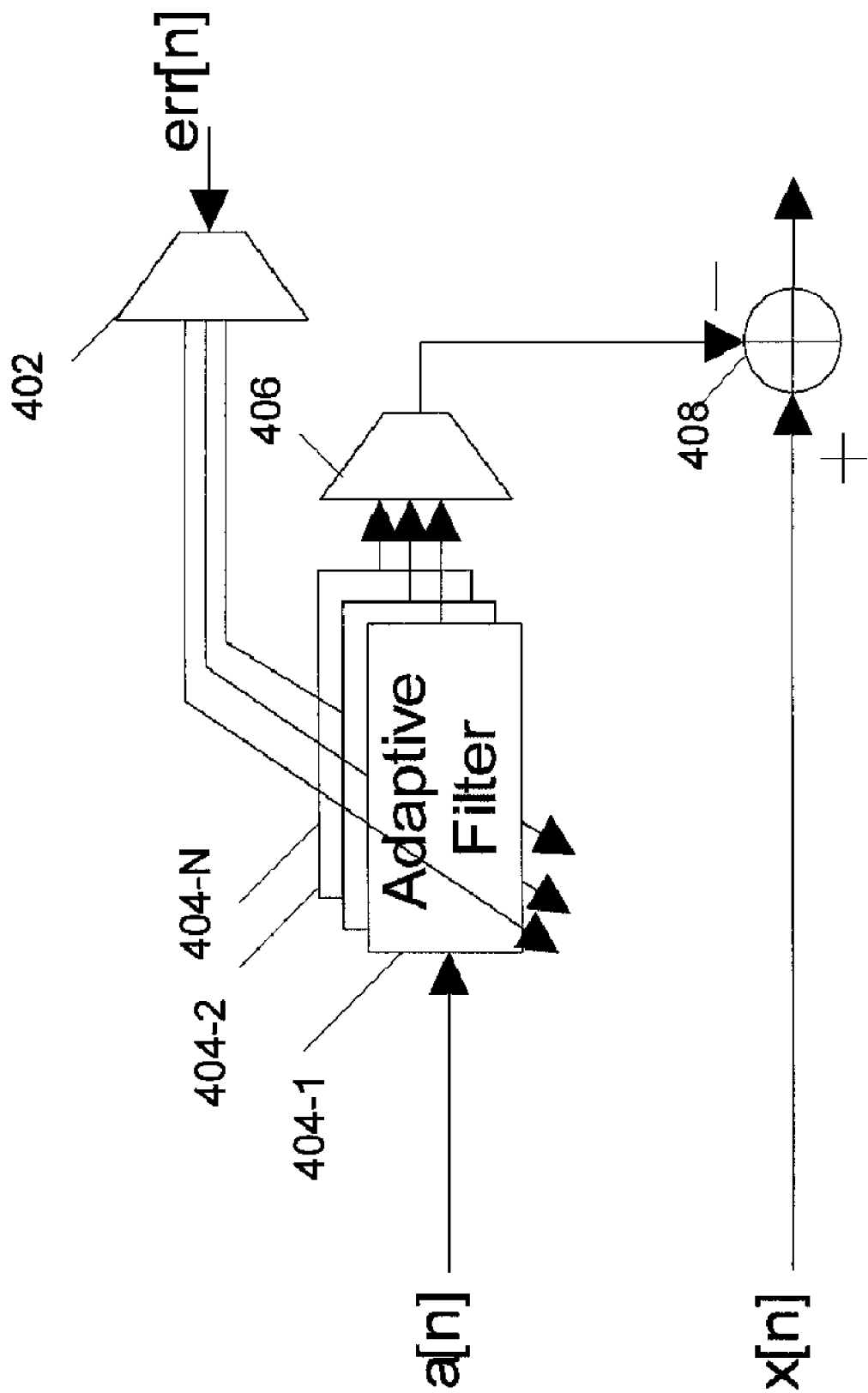
FIGS. 4-7 depict noise reducing systems, in accordance with some embodiments of the present invention.

The system of FIG. 4 presents one suitable technique to address periodic jitter at least when periodic jitter has a period which is a multiple of the basic clock period, T. Based on equation 2 and assuming that jitter is periodic (e.g., with a period of N*T in the general case) each of the channel coefficients (i.e., specific value of i) repeats itself once per N symbols. Accordingly, if J2[n]=J2[n+N] and J1[n]=J1[n+N], h[i] at time n is equal to h[i] at time n+N. Therefore, it is possible to refer to the echo transfer-function as N periodically interleaved transfer-functions which need to be estimated.

Instead of estimating the traditional transfer function values in t=i*T, N values per "i" may be estimated and used at the cancellation scheme in a periodic manner. Hence, in the nth cycle, the transfer channel can be modeled differently than in the next N−1 cycles (will repeat only in the $N^{th}$ next cycle). In such case, given that the local transmitted data is known and the channel is modeled properly, the echo may be substantially reduced in the received signal.

Figure 5:
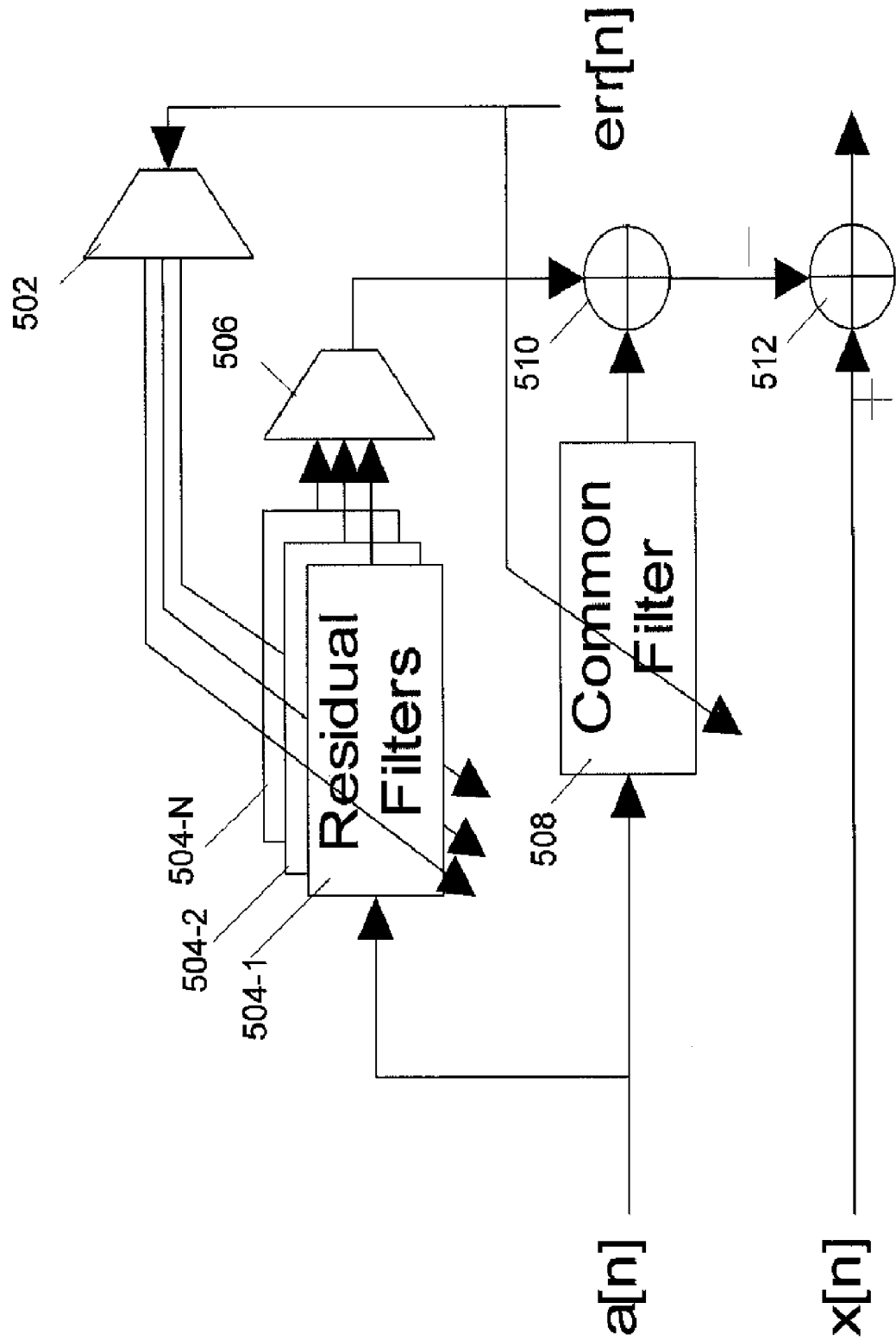

FIGS. 4 and 5 depict examples of interference cancellers in accordance with some embodiments of the present invention. The interference cancellers may be used at least to reduce echo, NEXT, FEXT, and/or inter-symbol interference (ISI) in a feed-back mode. The cancellers may attempt to estimate the amount of added noise based on a known reference signal and a channel estimation. For example, the reference signal may be: transmitted symbols from the local transmitter in the case of echo reduction; transmitted symbols from the neighbor transmitters in the case of NEXT reduction; or slicer decisions in the case of ISI reduction. If the channel estimation is accurate, the added noise may be expressed as the response of the channel to the known input reference signal. Therefore, the added noise can be subtracted from the received signal and any of echo, NEXT, FEXT, and/or ISI may be reduced.

FIG. 4 depicts a non-linear canceller capable to reduce periodic jitter impact from a channel in a received signal, in accordance with some embodiments of the present invention. Selector 402 may transfer signal err[n] to each of filter 404-1 to 404-N depending on which filter or lane is activated. The value N may be a number of clock edges after which all or some of the periodic jitter repeats itself and N may be any integer greater than or equal to two. Signal err[n] may be provided at the canceller output from summer 408 or may be based on error present in one or more decision from a decision logic such as but not limited to slicer logic. Slicer logic may be decision logic in a signal receiver.

Each of filter 404-1 to 404-N may receive signal a[n]. Signal a[n] may be a reference signal and can include local or neighbor transmitter data to be transmitted prior to insertion in the channel where echo or NEXT are to be reduced. Signal a[n] may be a decision from a decision logic (e.g., slicer) where ISI or FEXT are to be reduced. Any of filter 404-1 to 404-N may be implemented as an adaptive filter. For example, one or more adaptive filter may use least-mean-square (LMS) techniques. The manner of use of signal err[n] may be defined by the filter techniques used by the adaptive filter. In some embodiments, an input lane to a selected one of filter 404-1 to 404-N is activated once per N clock edges in a periodic manner. Although not a necessary feature of any embodiment, in part due to the dynamic enabling of lanes feeding each of filters 404-1 to 404-N, power consumption level may be similar to the one of the traditional scheme, although achieving much better performance in the presence of periodic jitter.

In some embodiments, filters 404-1 to 404-N can be implemented as one filter path with N coefficient sets where in each clock cycle, a coefficient set associated with the clock cycle is used. In such embodiments, multiplexer 406 may not be used.

Multiplexer 406 may transfer signals generated by any of filter 404-1 to 404-N in response to signal a[n] and in part based on signal err[n] to summer 408. An output from any of filter 404-1 to 404-N may be used to reduce noise attributable to jitter in signal x[n]. Summer 408 may subtract signals provided from any of filters 404-1 to 404-N from signal x[n]. Signal x[n] may be a version of the sampled received signal. A signal provided from summer 408 may be a signal having reduced jitter-related noise and can be eventually used as an input to decision logic such as a slicer logic.

In some embodiments, if N is fairly large, a coefficient set used by each of filters 404-1 to 404-N may be updated slowly (once per N clock cycles when it is active) causing long convergence time and reducing the ability to track slow changes in the channel properties (e.g., due to temperature variations). However, when dealing with reasonable jitter magnitudes, the resultant variations in the channel can be relatively small (although its impact on performance might be significant as may happen in the 10GBASE-T compliant technology) so the different coefficient segments are expected to be close one to the other. Therefore, the convergence problem can be solved by first letting one of filters 404-1 to 404-N to adapt its coefficients in all of the clock cycles and after a period of time, copy the converged coefficients to the other filters 404-1 to 404-N so the other filters have a more ideal starting point.

FIG. 5 depicts a system, in accordance with some embodiments of the present invention. The system of FIG. 5 can be used to address tracking of slow changes in channel characteristics. Common filter 508 may be implemented as an adaptive filter, such as but not limited to least mean square (LMS). Common filter 508 may generate an output signal based in part on signal a[n] and signal err[n]. The adaptive filter may utilize signal err[n] in a manner prescribed by its logic. Signal a[n] may be a reference signal that may include a local or neighbor transmitter signal to be transmitted prior to insertion in the channel in the cases where echo or NEXT are to be reduced. Signal a[n] may be a decision from decision logic (e.g., slicer decision) in the cases where ISI or FEXT are to be reduced. Signal err[n] may be provided at the canceller output from summer 512 or may be based on error present in one or more decision of a decision logic (e.g., slicer logic). Common filter 508 may continuously track an "averaged" channel because it receives the error signal from all the jittered N periodically interleaved channel estimations. Common filter 508 may be enabled first and after common filter 508 converges, any of filters 504-1 to 504-N may operate.

The term "common" may refer to the N periodically interleaved channel estimations. Because the jitter is expected to be small, all the periodically interleaved channels are expected to be fairly close to one another. Therefore, one "common" channel estimation plus a set of N residual estimated channels (which are selected one at a time in a periodic manner) may be used.

Filters 504-1 to 504-N may process signal a[n] based in part on signal err[n]. Any of filters 504-1 to 504-N may be implemented as a residual filter. Any residual filter may be implemented by using an adaptive filter, such as but not limited to least mean square (LMS). Signal err[n] may be provided by selector 502 to the filter among filters 504-1 to 504-N that is to receive the signal err[n] for the current clock cycle. In some embodiments, an input lane associated with a selected one of filter 504-1 to 504-N is activated once per N clock edges in a periodic manner. Filters 504-1 to 504-N may generate signals in response to signal a[n] and based in part on signal err[n]. Use of signal err[n] may be defined by the filter techniques used by the adaptive filter. Each of filters 504-1 to 504-N may converge to the residual difference of each interleaved channel from the average. An advantage of this system, but not a necessary feature of any embodiment, is that it allows reducing the parallel coefficients sets to be used approximately for positions where the channel has large slopes and accordingly, and accordingly save power and die size. The positions may be learned from the common filter converged coefficients. In some embodiments, by first letting the common branch converge, the estimated average channel may be examined and the residual branches may be applied primarily to the channel portions where slope magnitude is large. By doing so, most of the jitter effects may be reduced and power/die-size may be optimized.

In some embodiments, filters 504-1 to 504-N can be implemented as one filter path with N coefficients sets where in each clock cycle, a coefficient set associated with the current clock cycle is used. Multiplexer 506 may not be used in such embodiments.

Summer 510 may sum signals generated by common filter 508 with signals transferred from multiplexer 506 that are generated by any of filters 504-1 to 504-N. Signals from common filter 508 and signals from any of filters 504-1 to 504-N can be used to reduce noise. Summer 512 may subtract the summation signal from summer 510 from signal x[n]. Signal x[n] may be a version of a received signal. A signal provided from summer 512 may be a signal with reduced jitter-related noise and can eventually be used as an input to decision logic such as a slicer logic.

Figure 6A:
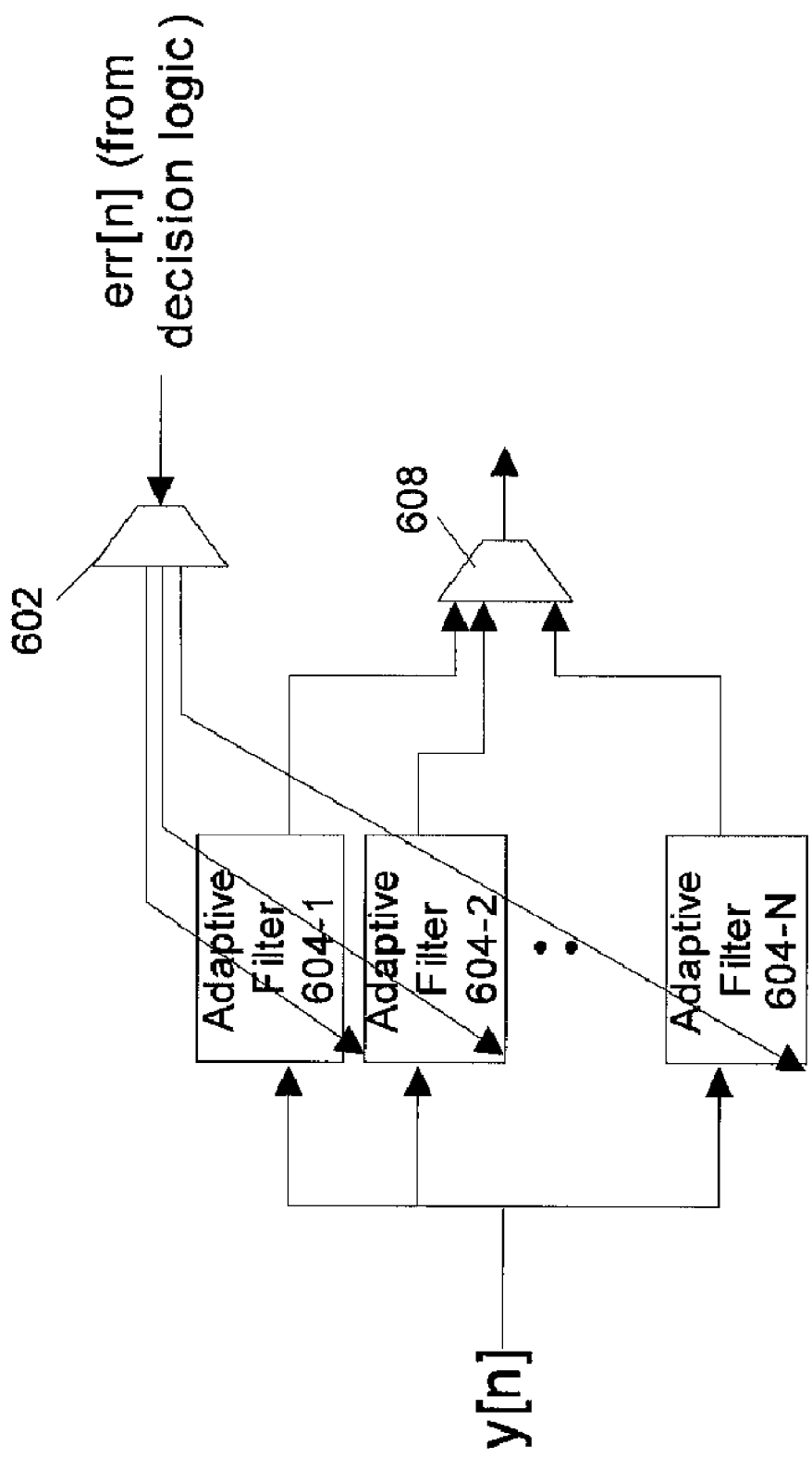

FIG. 6A depicts a feed-forward equalizer, in accordance with some embodiments of the present invention. Signal y[n] may be a signal received through a channel. Any of filter 604-1 to 604-N may process signal y[n] based in part on signal err[n]. Signal err[n] may be based on error present in one or more decision of a slicer logic or decision logic. Selector 602 may provide a signal err[n] to the filter among filter 604-1 to 604-N that is to be active during a current time. Assuming jitter is present that repeats itself after N clock edges, then N filters may be used while each filter is activated once per N clocks in a periodic manner. In some embodiments, an input lane associated with a selected one of filter 604-1 to 604-N is activated once per N clock edges in a periodic manner. Any of filters 604-1 to 604-N may be implemented as an adaptive filter, such as but not limited to LMS. Use of signal err[n] may be defined by the filter techniques used by the adaptive filter. Although not a necessary feature of any embodiment, in part due to the dynamic enabling of lanes feeding each of filters 604-1 to 604-N, a power consumption level may be similar to the traditional scheme, although reducing more noise from periodic jitter. Multiplexer 608 may provide an output signal from any of filters 604-1 to 604-N. The signal provided from the equalizer may be eventually used as an input to a decision logic such as a slicer logic.

In some embodiments, filters 604-1 to 604-N can be implemented as one filter path with N coefficients sets where in each clock cycle, a coefficient set associated with the current clock cycle is used. Multiplexer 608 may not be used in such embodiments.

At least because of dynamic enabling of the different segments, power consumption level may be similar to that of traditional schemes, although effects from periodic jitter may be reduced more effectively.

Figure 6B:
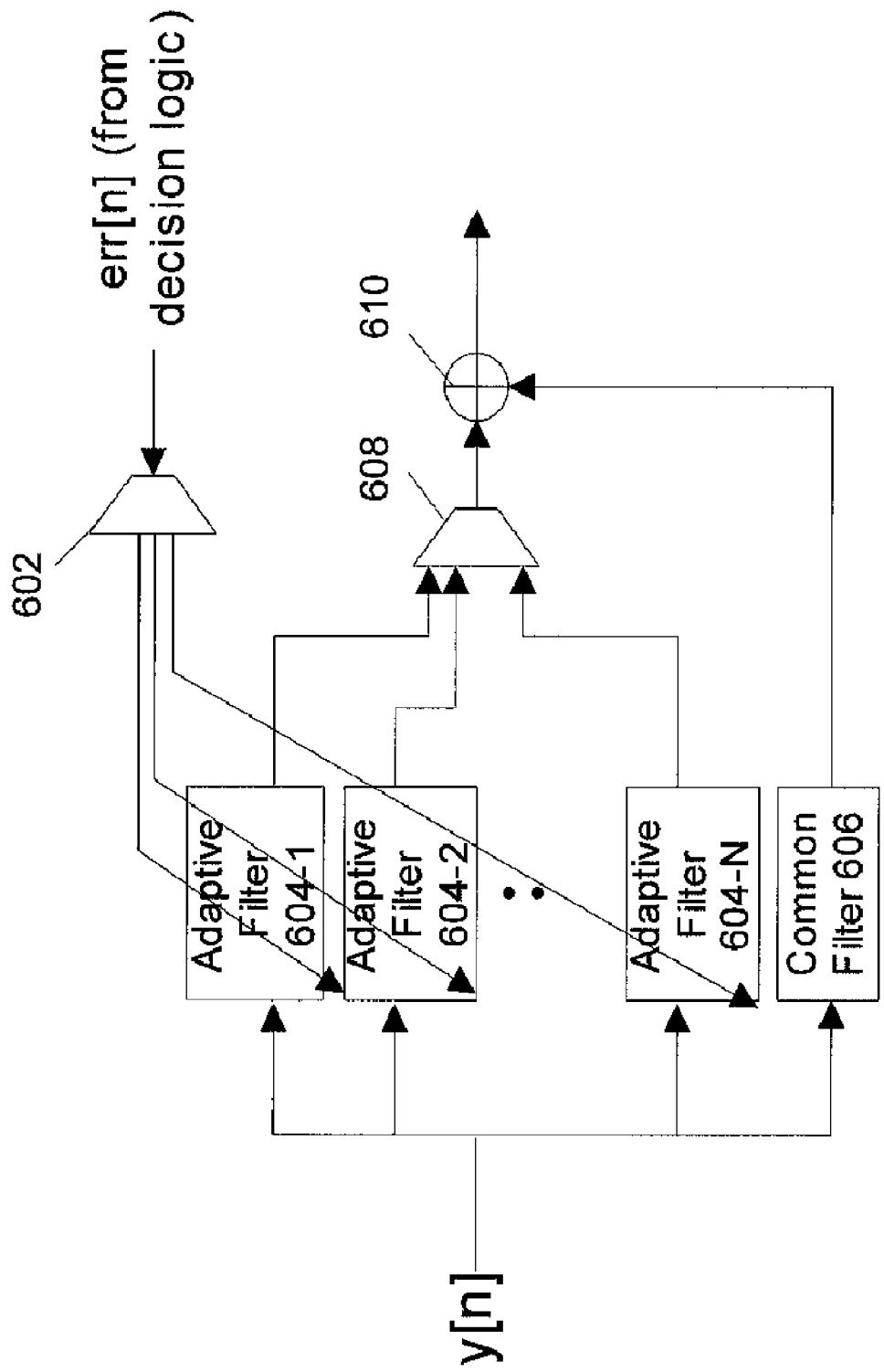

FIG. 6B depicts a feed-forward equalizer, in accordance with some embodiments of the present invention. Signal y[n] may be a signal received through a channel. Common filter 606 may generate an output signal based in part on signal y[n]. Common filter 606 may be implemented as an adaptive filter such as but not limited to LMS. The term "common" may refer to N periodically interleaved channel estimations. Because the jitter is expected to be small, all the periodically interleaved channels are expected to be fairly close to one another. Therefore, one "common" channel estimation and a set of N residual estimated channels (which are selected one at a time in a periodic manner) may be used.

Selector 602 may provide a signal err[n] to the adaptive filter among filter 604-1 to 604-N that is active during a current time. Assuming jitter is present that repeats itself after N clock edges, then N filters may be used while each filter is activated once per N clocks in a periodic manner. Any of filter 604-1 to 604-N may process signal y[n] based in part on signal err[n]. Signal err[n] may be based on error present in one or more decision of a slicer logic. Use of signal err[n] may be defined by the filter techniques used by the adaptive filter such as but not limited to LMS. In some embodiments, an input lane associated with a selected one of filter 604-1 to 604-N is activated once per N clock edges in a periodic manner. Any of filter 604-1 to 604-N may be implemented as an adaptive filter. Although not a necessary feature of any embodiment, in part due to the dynamic enabling of lanes feeding each of filters 604-1 to 604-N, power consumption level may be similar to the traditional scheme, although reducing more noise from periodic jitter. Multiplexer 608 may provide an output signal from any of filters 604-1 to 604-N.

In some embodiments, filters 604-1 to 604-N can be implemented as one filter path with N coefficients sets where in each clock cycle, a coefficient set associated with the current clock cycle is used. Multiplexer 608 may not be used in such embodiments.

Summer 610 may sum a signal provided by any of filters 604-1 to 604-N with a signal provided by common filter 606. The signals provided by filters 604-1 to 604-N may reduce noise related to jitter. A signal provided from summer 610 may be a signal with reduced jitter-related noise and can be used eventually as an input to a decision logic such as a slicer logic.

Figure 7:
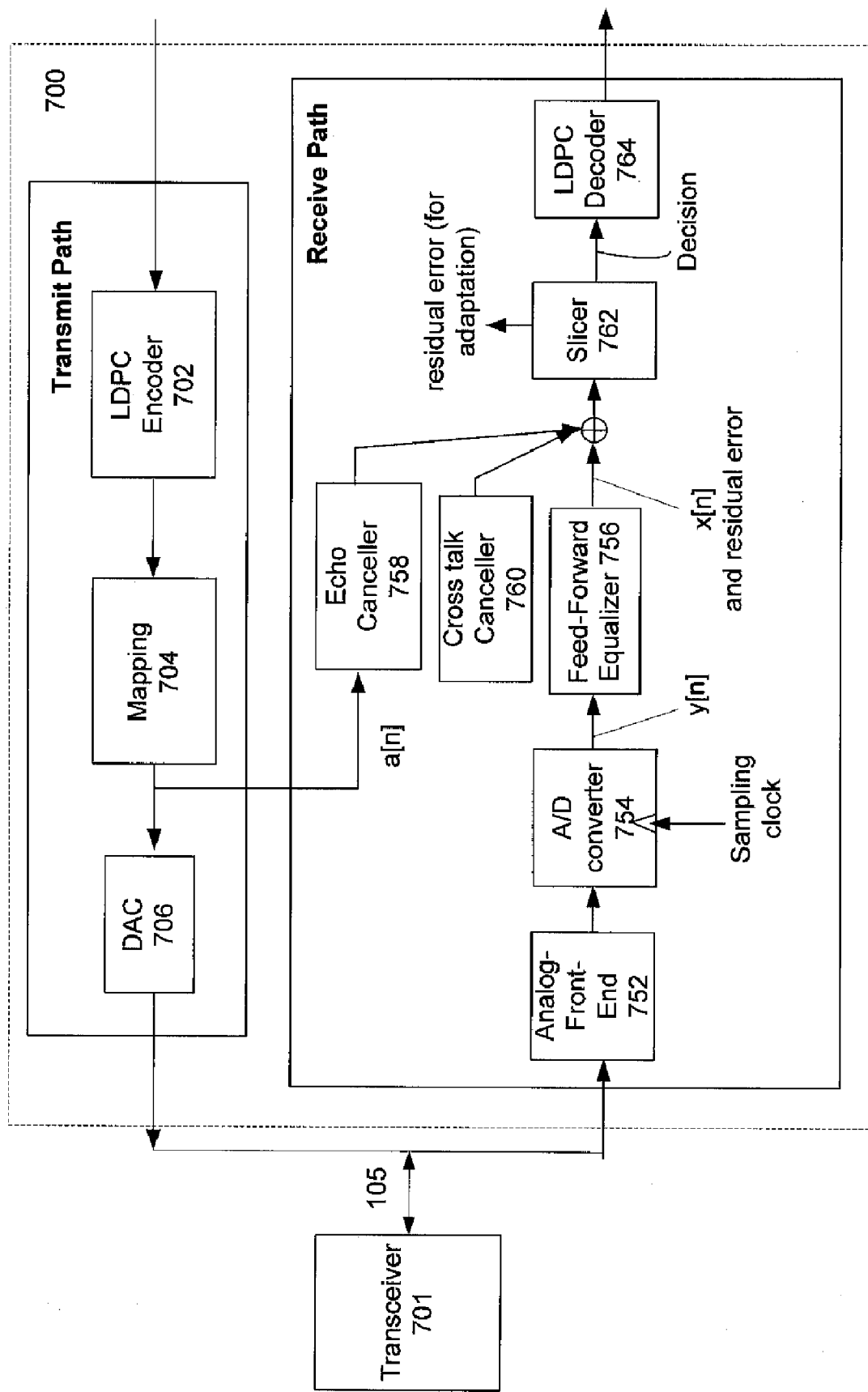

FIG. 7 depicts a system in which some embodiments of the present invention can be used. The system may be used in combination with a 10GBASE-T compliant transceiver, although the system may be used in system that comply with other protocols such as but not limited to 1000BASE-T and/or 10GBASE-CX4 (both described in IEEE 802.3-2005). The system can be used by a computer system to transmit and receive signals. The computer system may include at least one or more processor core, a chipset, bus, storage device, memory, display device, and any user interface.

The system of FIG. 7 may include a transmit path and a receive path. The transmit path may at least include a low density parity check (LDPC) encoder 702, mapping logic 704, and digital to analog converter (DAC) 706. For example, encoder 702 may receive a payload bit stream and provide a coded bit stream encoded in accordance with low-density parity-check codes (LDPC). Mapping logic 704 may map the coded bit stream into a modulation scheme such as pulse amplitude modulation symbols with 16 possible values, provide 128 double square (DSQ) symbols, and provide Tomlinson-Harashima preceding on the 128 DSQ symbols. For example, LDPC is described at least in R. G. Gallager, "Low-density parity-check codes," IRE Trans. Inform. Theory, vol. 8, pp. 21-28, January 1962. In some embodiments, other forward-error correction (FEC) coding schemes may be used instead of or in addition to LDPC. Signal a[n] may be local transmitter data to be transmitted using the channel and prior to insertion into the channel. Signal a[n] may be provided to the receive path.

The receive path may at least include analog front end 752, analog to digital (A/D) converter 754, feed-forward equalizer 756, echo canceller 758, cross talk (e.g., NEXT and FEXT) canceller 760, slicer 762, and LDPC decoder 764. In parallel to echo canceller 758 and cross talk canceller 760, a decision-feedback equalization (DFE) feedback filter may be added for better ISI reduction. A/D converter 754 may convert a received analog signal into digital format according to a sampling clock signal and provide the digital format signal to feed-forward equalizer 756.

Feed-forward equalizer 756 may reduce inter-symbol interference (ISI). Feed-forward equalizer 756 may be implemented as an adaptive finite impulse response (FIR) filter with coefficients adapted to reduce ISI. In some embodiments, feed-forward equalizer 756 may be implemented using the equalizer described with respect to FIG. 6A or 6B.

Echo canceller 758 may provide a signal to reduce echo in a signal received from a channel, namely, x[n]. In some embodiments, echo canceller 758 may be implemented using the techniques described with respect to FIG. 4 or 5.

Cross talk canceller 760 may provide a signal to reduce noise in signal x[n] where the noise may be but not limited to echo cancellation, near-end cross talk cancellation (NEXT), and/or far-end cross talk cancellation (FEXT). In some embodiments, cross talk canceller 760 may be implemented using the techniques described with respect to FIG. 4 or 5.

In the case of 10GBASE-T, two consecutive inputs to a slicer for each channel may be an estimated 128DSQ symbol with residual noises. Slicer 762 is the receiver decision element. After the signal passes the equalization and cancellation array, it is compared to the possible transmission hypothesis, and slicer 762 outputs the receiver decision and the residual error. As an example, for a PAM2 system, the transmitted symbols may be only −1 or 1. If the slicer input is 0.7, then slicer 762 may output 1 and the error would be 0.3. For example, after reducing noise in the input signal, slicer 762 may provide a soft decision symbol to LDPC decoder 764. Slicer 762 may provide residual error, signal err[n], for use to reduce noise in received signals.

For example, on symbols provided by slicer 762, LDPC decoder 764 may perform parity check nodes processing, bit nodes processing, uncoded bit extraction, and/or decoding in accordance with low-density parity-check codes. For example, LDPC decoder 764 may use any or a combination of the following schemes: Maximum Aposteriori Probability, Bahl Cocke Jelinek and Raviv, Uniformly Most Powerful, and/or Sum-Product Algorithm. LDPC decoder 764 may output hard decision symbols that may include data as well as other information described in 10GBASE-T. In some embodiments, other forward-error correction (FEC) coding schemes may be used instead of or in addition to LDPC. Data as well as other information may be used by applications of a host system or other device such as but not limited to electronic mail or internet website content.

Transceiver 700 and transceiver 701 may communicate. In some embodiments, communication between transceiver 700 and transceiver 701 may be provided at least using line 105. In some embodiments, line 105 may include copper material and may provide capability of intercommunication between nodes at data transfer rates of at least approximately ten (10) gigabits per second bi-directionally (i.e., transmitting data at 10 gigabits per second while receiving data at 10 gigabits per second), although other transfer rates can be used. For example, each of transceiver 700 and transceiver 701 may communicate over line 105 in accordance with 10GBASE-T, although other standards may be used such as those described in the family of IEEE 802.3. For example, line 105 may include twisted pairs of copper wire. For example, line 105 may be Category 5, 6, 6a, or 7 network cabling and/or any other shielded or unshielded cabling. In some embodiments, communication between transceiver 700 and transceiver 701 may be provided using a network of any type of medium which is accessible using twisted pairs of copper wire, optic channels, wireless channels, power-line channels, acoustic/sonar channels, printed circuit board (PCB), backplanes, coaxial cable, or any other medium.

Figure 8:
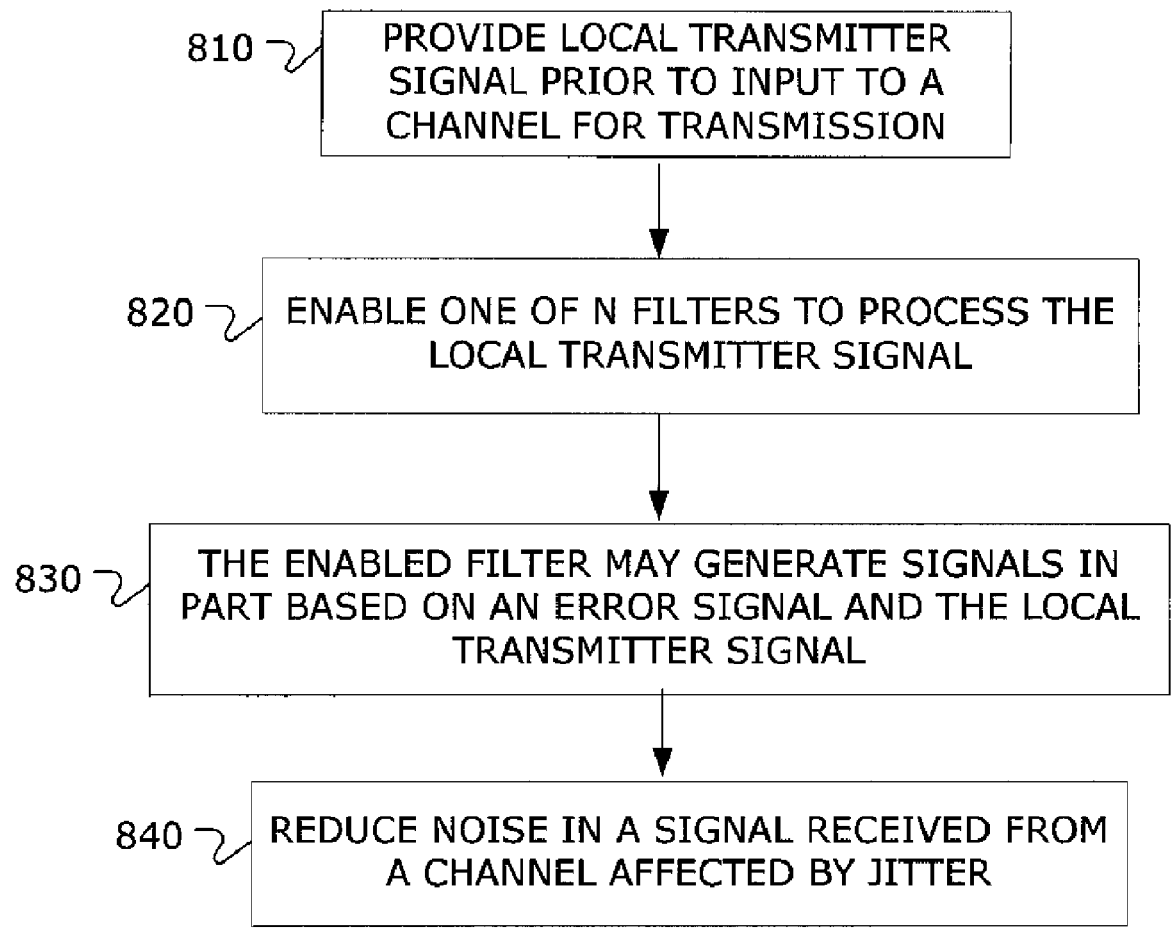
FIGS. 8-10 depict processes that can be used to reduce signal noise, in accordance with some embodiments of the present invention.

FIG. 8 depicts a process that can be used to reduce noise arising from jitter in some embodiments of the present invention. In block 810, a local transmitter signal prior to input to a channel for transmission is provided.

In block 820, one of N filters is enabled to process the local transmitter signal. Each of the filters may be a residual filter, such as LMS. The value N may be a number of clock edges after which all or some of the periodic jitter repeats itself and N may be any integer greater than or equal to two. To enable a filter, a lane feeding the selected filter can be activated once per N clock edges in a periodic manner. In some embodiments, the N filters can be implemented as one filter path with N coefficients sets where in each clock cycle, a coefficient set associated with the clock cycle is used.

In block 830, the enabled filter may generate signals in part based on an error signal and the local transmitter signal. The enabled filter may perform adaptive filtering based on the local transmitter signal and the error signal. The error signal may be provided at the output from block 840 or may be based on error present in one or more decision of a slicer.

In block 840, noise can be reduced in a signal received from a channel affected by jitter. In some embodiments, the signal provided by one of the filters can be subtracted from the signal received from a channel affected by jitter.

Figure 9:
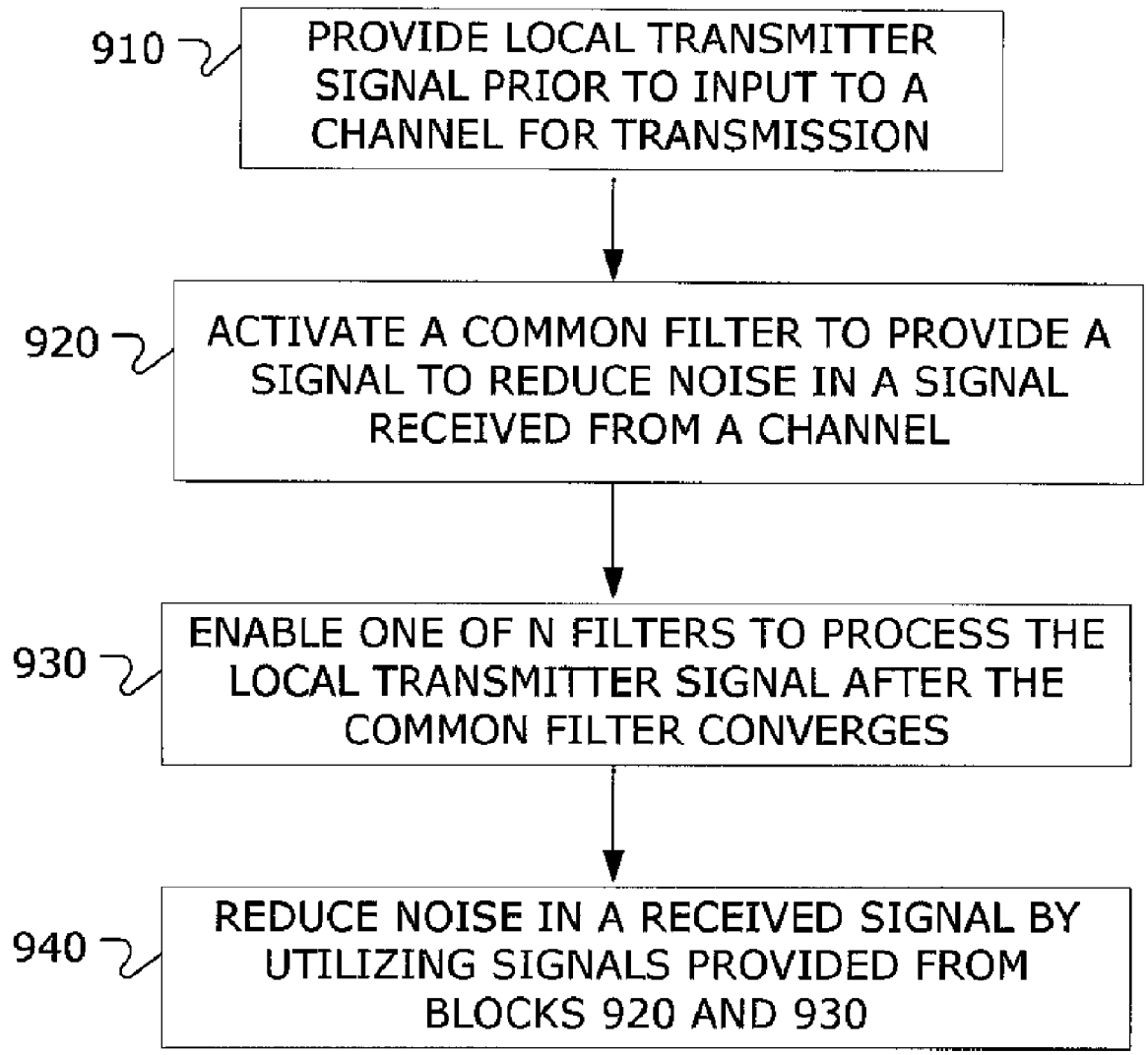

FIG. 9 depicts a process that can be used to reduce noise arising from jitter in some embodiments of the present invention. In block 910, a local transmitter signal prior to input to a channel for transmission is provided.

In block 920, a common filter is activated to provide a signal to reduce noise in a signal received from a channel. The common filter may generate a noise reducing signal based on the local transmitter signal as well as an error signal. The error signal may be provided at the output from block 940 or may be based on error present in one or more decision of a slicer. The common filter may continuously track an "averaged" channel because it is receiving the error signal from all the jittered channels. The common filter may be implemented as an adaptive filter, such as but not limited to LMS.

In block 930, one of N filters is enabled to process the local transmitter signal after the common filter converges. The enabled filter may generate signals in part based on an error signal and the local transmitter signal. Each of the filters may be a residual filter, such as LMS. The value N may be a number of clock edges after which all or some of the periodic jitter repeats itself and N may be any integer greater than or equal to two. To enable a filter, a lane feeding the selected filter can be activated once per N clock edges in a periodic manner. In some embodiments, the N filters can be implemented as one filter path with N coefficients sets where in each clock cycle, a coefficient set associated with the clock cycle is used.

In block 940, noise in a received signal may be reduced by utilizing signals provided from blocks 920 and 930. The resulting signal may have reduced noise from jitter and can be eventually used as an input to the slicer logic.

Figure 10:
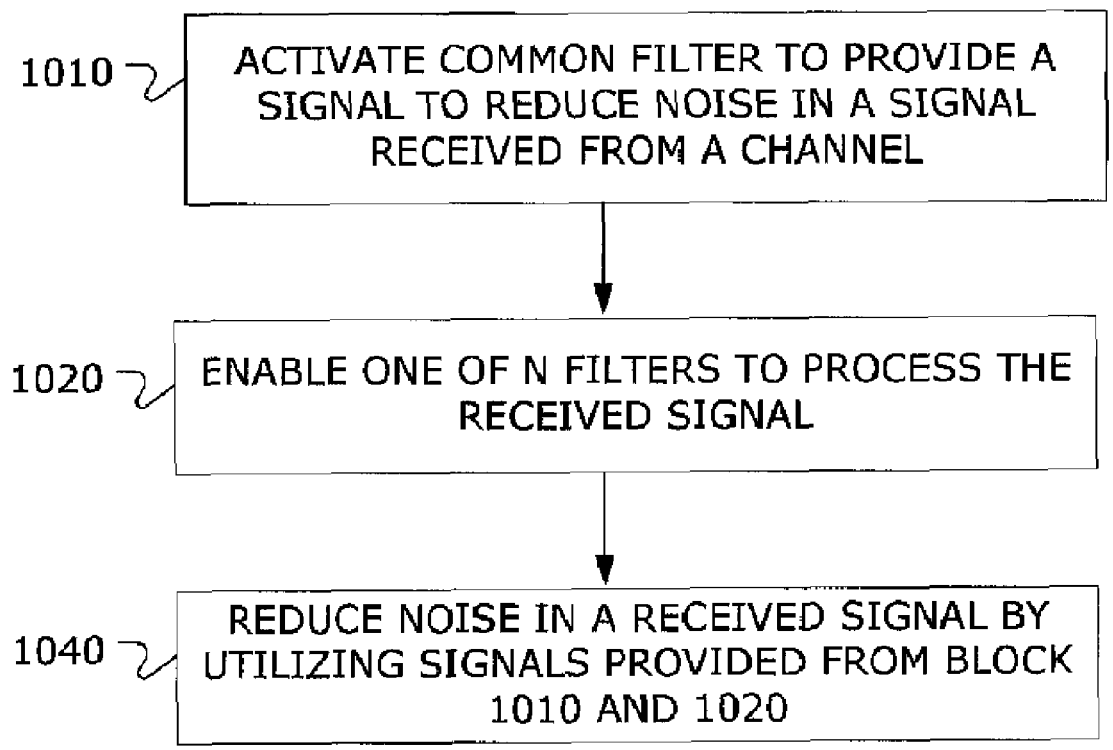

FIG. 10 depicts a process that can be used to reduce noise arising from jitter in some embodiments of the present invention. In block 1010, a common filter is activated to provide a signal to reduce noise in a signal received from a channel. The common filter may generate a noise reducing signal based on a received signal. The common filter may continuously track an "averaged" channel because it is receiving the error signal from all the jittered channels. The common filter may be implemented as an adaptive filter such as LMS.

In block 1020, one of N filters is enabled to process the received signal. The enabled filter may generate signals in part based on an error signal and the received signal. The error signal may be based on error present in one or more decision of a slicer. Each of the filters may be a residual filter, which can be an adaptive filter such as LMS. The value N may be a number of clock edges after which all or some of the periodic jitter repeats itself and N may be any integer greater than or equal to two. To enable a filter, a lane feeding the selected filter can be activated once per N clock edges in a periodic manner. In some embodiments, the N filters can be implemented as one filter path with N coefficients sets where in each clock cycle, a coefficient set associated with the clock cycle is used.

In block 1030, noise in a received signal may be reduced by utilizing signals provided from blocks 1010 and 1020. The resulting signal may have reduced noise from jitter and can be eventually used as an input to the slicer logic.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments of the present invention may also be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. Moreover, the actions any flow diagram need not be implemented in the order shown; nor do all of the acts necessarily need to be performed. Also, those acts that are not dependent on other acts may be performed in parallel with the other acts. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. A method performed by a system comprising:
   providing a noise reducing signal using an input signal and based in part on an error signal, wherein:
   the noise reducing signal reduces jitter-related noise,
   the providing a noise reducing signal comprises applying filtering using at least one of X filters,
   X is an integer greater than or equal to 2,
   X is a period of sampled channel-related jitter in terms of clock cycles, the at least one of X filters that is used is associated with a current clock cycle, and each of the X filters has an associated set of coefficients; and reducing noise in a second input signal based in part on the noise reducing signal.

2. The method of claim 1, wherein the applying filtering using at least one of X filters comprises enabling a lane associated with the at least one of X filters.

3. The method of claim 1, wherein the input signal comprises a reference signal.

4. The method of claim 1, wherein the second input signal comprises a signal received from a channel.

5. The method of claim 1, wherein the at least one of X filters comprises an adaptive filter.

6. The method of claim 1, further comprising:
providing a second noise reducing signal using the input signal and based in part on the error signal, wherein:
providing a second noise reducing signal comprises providing a second noise reducing signal based on X periodically interleaved channel jitter estimations.

7. The method of claim 6, wherein the reducing noise in a second input signal comprises reducing noise in a second input signal based in part on the noise reducing signal and the second noise reducing signal.

8. The method of claim 6, wherein the providing a second noise reducing signal comprises using a common filter.

9. The method of claim 8, wherein the at least one of X filters comprises an adaptive residual filter and the common filter comprises an adaptive filter.

10. The method of claim 9, wherein the at least one of X filters operates after the common filter reaches convergence.

11. An apparatus comprising:
at least X adaptive filters, each of the at least X filters is to provide an interference reducing signal using a reference signal and based in part on an error signal, wherein X is an integer greater than or equal to 2, the interference reducing signal reduces jitter-related noise, and each of the at least X filters has an associated set of coefficients, logic to enable one of at least X filters based in part on a current clock cycle; and logic to reduce noise in a received signal based in part on the interference reducing signal.

12. The apparatus of claim 11, wherein X is a period of sampled channel-related jitter in terms of clock cycles.

13. The apparatus of claim 11, wherein the logic to enable is to enable a lane associated with the one of at least X filters.

14. The apparatus of claim 11, further comprising:
a common filter to provide a second interference reducing signal using the reference signal and based in part on the error signal, wherein the second interference reducing signal is based on X periodically interleaved sampled channel estimations.

15. The apparatus of claim 14, wherein the logic to reduce noise in a received signal is to reduce noise based in part on the interference reducing signal and based in part on the second interference reducing signal.

16. The apparatus of claim 14, wherein the one enabled filter is to operate after the common filter reaches convergence.

17. An apparatus comprising:
at least X filters, each of the at least X filters to provide a noise reducing signal based in part on a received signal and based in part on an error signal, wherein X is an integer greater than or equal to 2,
a common filter to provide a second noise reducing signal based in part on the received signal; and
logic to enable one of at least X filters based in part on a current clock cycle.

18. The apparatus of claim 17, wherein the logic to enable is to enable a lane associated with the one of at least X filters.

19. The apparatus of claim 17, wherein at least one of the X filters comprises an adaptive filter.

20. The apparatus of claim 17, wherein the common filter comprises an adaptive filter.

21. The apparatus of claim 17, wherein the common filter is to provide the second noise reducing signal based on X periodically interleaved sampled channel estimations.

22. A system comprising:
a network medium; and
a transceiver communicatively coupled to the network medium, wherein
the transceiver comprises a transmitter and a receiver,
the transmitter provides a local transmitter signal to be transmitted,
the receiver comprises:
a decision unit comprising a slicer to provide an error signal based in part on a signal received by the receiver,
noise reducing logic capable to provide an interference reducing signal based in part on the local transmitter signal and the error signal and to reduce noise in the signal received by the receiver using the interference reducing signal, wherein the interference reducing signal is to reduce noise attributable to periodic jitter, and
a decoder to decode signals from the slicer.

23. The system of claim 22, wherein the network medium comprises at least one of backplane channels, Category 5, 6, 6A, or 7 network cabling, shielded, and unshielded cabling.

24. The system of claim 22, further comprising a computer system communicatively coupled to the transceiver.

25. The system of claim 22, wherein the decoder is to use low density parity check decoding scheme.

* * * * *